United States Patent [19]

Miyake et al.

[11] 4,453,824
[45] Jun. 12, 1984

[54] VARIABLE MAGNIFICATION COPYING APPARATUS

[75] Inventors: Hiroyuki Miyake, Inagi; Seiji Sagara, Kawasaki; Kazuo Kagiura; Nobukazu Sasaki, both of Tokyo; Takaji Yonemori, Kawasaki, all of Japan

[73] Assignee: Canon Kabushiki Kaisha, Tokyo, Japan

[21] Appl. No.: 405,307

[22] Filed: Aug. 4, 1982

Related U.S. Application Data

[63] Continuation of Ser. No. 160,172, Jun. 17, 1980, abandoned.

[30] Foreign Application Priority Data

Jun. 22, 1979 [JP] Japan .................................. 54-78948
Aug. 28, 1979 [JP] Japan .................................. 54-108642

[51] Int. Cl.³ ....................... G03B 27/34; G03B 27/70
[52] U.S. Cl. .................................... 355/57; 355/8
[58] Field of Search .................................... 355/8, 57, 60

[56] References Cited

U.S. PATENT DOCUMENTS

| | | | |
|---|---|---|---|
| 4,027,963 | 6/1977 | Hoppner et al. | 355/57 |
| 4,029,409 | 6/1977 | Spinelli et al. | 355/8 |
| 4,040,733 | 8/1977 | Satomi | 355/57 |
| 4,053,221 | 10/1977 | Lynch | 355/57 |
| 4,084,897 | 4/1978 | Queener | 355/57 |
| 4,209,248 | 6/1980 | Gibson et al. | 355/57 |

*Primary Examiner*—Monroe H. Hayes
*Attorney, Agent, or Firm*—Fitzpatrick, Cella, Harper & Scinto

[57] ABSTRACT

A variable magnification copying apparatus capable of not only one-to-one magnification copying but also reduction copying, and particularly a variable magnification copying apparatus of the slit exposure scanning type which is capable of two or more types of reduction copying and which uses two movable mirrors and an in-mirror lens on the object side, characterized in that the optical axis of the in-mirror lens is set non-parallel to an original carriage to make the apparatus compact and during magnification change, the in-mirror lens and the second movable mirror are initially displaced by predetermined distances in predetermined directions, whereby the object point position and image point position of an image forming principal light ray on the original supporting surface and photosensitive surface are made fixed irrespective of the copying magnification.

9 Claims, 9 Drawing Figures

VARIABLE MAGNIFICATION COPYING APPARATUS

This is a continuation of application Ser. No. 160,172, filed June 17, 1980, now abandoned.

BACKGROUND OF THE INVENTION

1. Field of the Invention

This invention relates to a compact variable magnification copying apparatus using an in-mirror lens.

2. Description of the Prior Art

Among copying apparatus, there are those which use a transmission type lens as the image forming lens and those which use a reflection type, so-called in-mirror lens as the image forming lens.

The use of an in-mirror lens has the following advantages over the use of a transmission type lens:

1. The number of lenses constructed is one half of that of a transmission type lens;
2. The error of optical performance resulting from the errors in spatial arrangement of the lens (eccentricity and fall-down of the lens) tends to be cancelled when light is incident on the lens and when light is reflected and thus, a relatively great tolerance of the spatial arrangement of the lens is acceptable;
3. The mirror of the in-mirror lens serves also as the mirror which is provided in the optical path when a transmission type lens is used and therefore, the optical system can be made compact in the horizontal direction;
4. As compared with the transmission type lens, the in-mirror lens is one half the size thereof, thus economizing the space; and
5. The assembly and adjustment of a copying apparatus using an in-mirror lens is very easy and such effect is particularly great in the adjustment for absorbing any irregularity of the focal length.

As a variable magnification copying apparatus which uses an in-mirror lens and in which the object point position of a principal light ray is fixed irrespective of magnification change, there is known the apparatus as disclosed in U.S. Pat. No. 4,040,733, but in this apparatus, the optical axis of the in-mirror lens is parallel to the original carriage and this patent does not disclose a system in which the optical axis of the in-mirror lens is non-parallel to the original carriage, although this is considered to be effective to make the apparatus compact.

Generally, if the angle of view is made small in an in-mirror lens system, vertical compactness of the apparatus may be achieved, but if the optical axis of the in-mirror lens is parallel to the original carriage, the light rays impinging from a first movable mirror onto a second movable mirror tend to be kicked by the in-mirror lens barrel and thus, making the apparatus compact has been difficult.

U.S. Pat. No. 4,040,733 discloses that in a system having two movable mirrors on the object side, the mirror on the image side is displaced with the in-mirror lens during magnification change, whereas this requires the driving system for the mirror on the image side in addition to the slit scanning exposure driving system for the mirror on the object side and has not been favorable to make the apparatus compact.

U.S. Pat. No. 4,027,963 discloses a reduction copying system in which the optical axis of the in-mirror lens is non-parallel to the original carriage, but this is merely a system capable of reduction copying only in sheet mode with the aid of a mirror additionally provided. U.S. Pat. No. 4,053,221 merely discloses a reduction copying system available only in the sheet mode using lens interchange. U.S. Pat. No. 4,084,897 also discloses a reduction copying system in which the optical axis of the in-mirror lens is non-parallel to the original carriage, but this has suffered from a problem that during magnification change, the object point position of a principal light ray on the original surface is displaced and not fixed, so that the initial position of the slit exposure scanning differs.

SUMMARY OF THE INVENTION

It is an object of the present invention to provide a compact variable magnification copying apparatus of the slit exposure scanning type using an in-mirror lens which is capable of not only one-to-one magnification copying but also reduction copying, particularly, two or more types of reduction copying and in which irrespective of magnification change, the object point position and image point position of an image forming principal light ray on the original supporting surface and the photosensitive surface are not varied.

Such object is achieved by disposing two movable mirrors on the object side, making the optical axis of the in-mirror lens non-parallel to the original supporting surface, displacing the in-mirror lens by predetermined amounts in the direction of its optical axis and in the direction at right angles to the optical axis, and correspondingly displacing the second movable mirror parallel to the original supporting surface by a predetermined amount.

The in-mirror lens is rectilinearly moved along a straight guide rail and is minutely corrected to its regular optical position by an in-mirror lens position adjusting cam plate on which a predetermined portion of the in-mirror lens is placed.

The second movable mirror gains its drive force from a one-way rotation drive source common to the in-mirror lens and is moved by rotating cam surfaces and stopped at a highly accurate optical position corresponding to each copying magnification under the control of a stop position controlling member and a microswitch.

The invention will become more fully apparent from the following detailed description thereof taken in conjunction with the accompanying drawings.

DESCRIPTION OF THE PREFERRED EMBODIMENTS

Figure 1:
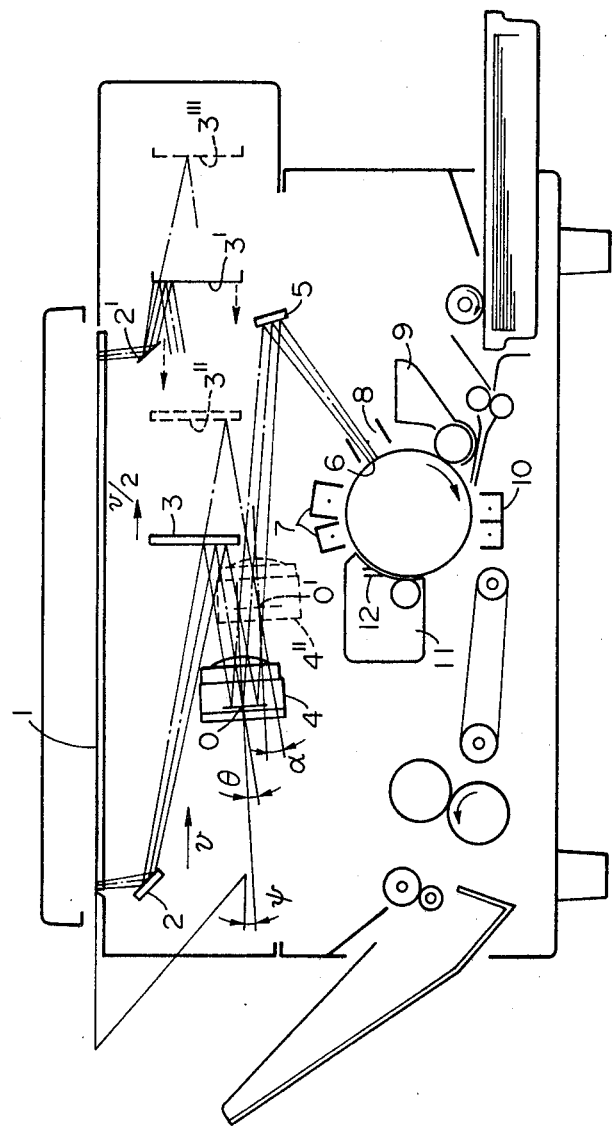
FIG. 1 is an illustration of a copying apparatus provided with the optical system of the present invention.

FIG. 1 illustrates a copying apparatus having an optical system according to the present invention. An original on an original carriage 1 is scanned by a first movable mirror 2 moved parallel to the original carriage 1 and a second movable mirror 3 moved at one half of the velocity of the first movable mirror 2 in the same direction as the first movable mirror. The light reflected by the first movable mirror 2 and the second movable mirror 3 is reflected by an in-mirror lens 4 so as to be imaged, and further reflected by a third mirror 5 toward a photosensitive drum 6 and forms a latent image on the charged photosensitive drum 6. This latent image is developed with the aid of developer and the developed image is transferred to paper or the like, and the image transferred to the paper or the like is fixed, whereafter the paper or the like is discharged. Reference numeral 7 designates a corona discharger, reference numeral 8 denotes an AC corona discharger, reference numeral 9 designates a developing device, reference numeral 10 designates a corona discharger, reference numeral 11 denotes a cleaning device, and reference numeral 12 denotes an elastic blade. On the photosensitive drum 6, there are overlaid, in succession from the center thereof, an electrically conductive substrate, a photoconductive layer and a transparent surface insulating layer.

The surface of the photosensitive drum 6 is uniformly charged by the corona discharger 7. The polarity of the charge is positive when the photoconductive layer is an N-type semiconductor, and negative when the conductive layer is a P-type semiconductor. Subsequently, the photosensitive drum 6 is exposed to an image light while, at the same time, it is discharged by the AC corona discharger 8, whereby a charge pattern corresponding to the optical image of the original is formed on the photosensitive drum 6. Further, the whole surface of the photosensitive drum is uniformly exposed to the light from a lamp, not shown, whereby an electrostatic latent image of good contrast is formed on the surface of the photosensitive drum. The latent image thus formed is visualized into a toner image by the developing device 9 which is of the cascade type or of the magnet brush type. When the toner image is transferred to transfer paper, charge of the opposite polarity to the toner forming the developed image is imparted to the surface of the transfer paper by the corona discharger 10. After the image transfer has been terminated, the surface of the photosensitive drum 6 is cleaned by the edge of the elastic blade 12 to wipe off any toner remaining thereon, thus becoming ready to be again subjected to another image processing cycle.

In FIG. 1, during one-to-one magnification copying, the first movable mirror 2 and the second movable mirror 3 scan the original to their respective positions 2' and 3', and then are reversed.

During reduction copying, the second movable mirror 3 and the in-mirror lens 4 are moved to their respective positions 3" and 4" before they start to scan the original, thereby correcting the length of the optical path before and after the lens to a length corresponding to the magnification selected. By a copy start signal, the first movable mirror 2 and the second movable mirror 3 scan the original at a velocity ratio of 2:1 from their respective positions 2 and 3" to their respective positions 2' and 3'". This scanning is effected at a velocity of "peripheral velocity of the photosensitive drum/reduction ratio".

Where there are three or more selectible copying magnifications, the position of the in-mirror lens 4 and the forward movement starting position of the second movable mirror 3 are of course set to three or more positions correspondingly to the respective magnifications.

Description will now be made of the displacement of the second movable mirror 3 and the in-mirror lens 4 during reduction copying.

Figure 2:
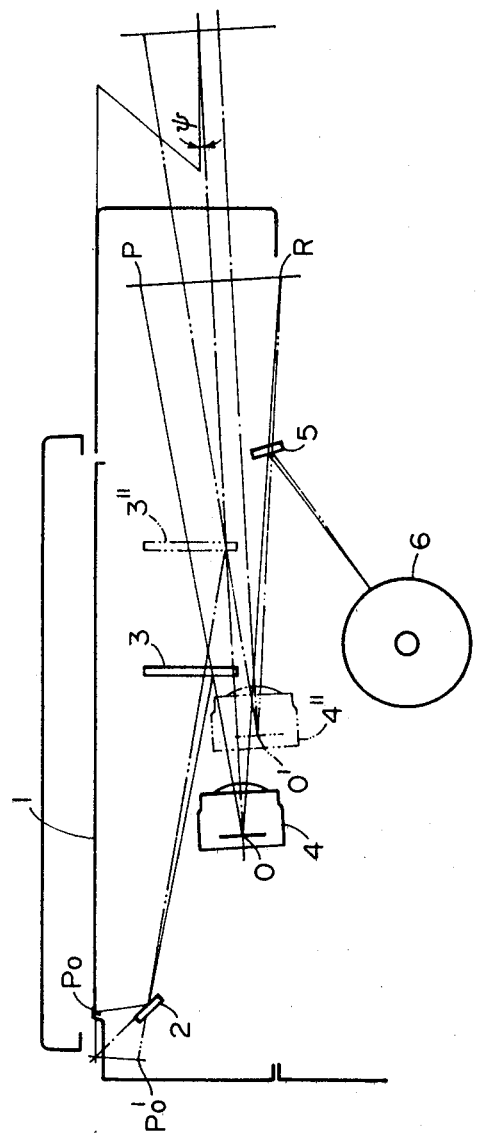
FIG. 2 shows the entire optical system.
Figure 3:
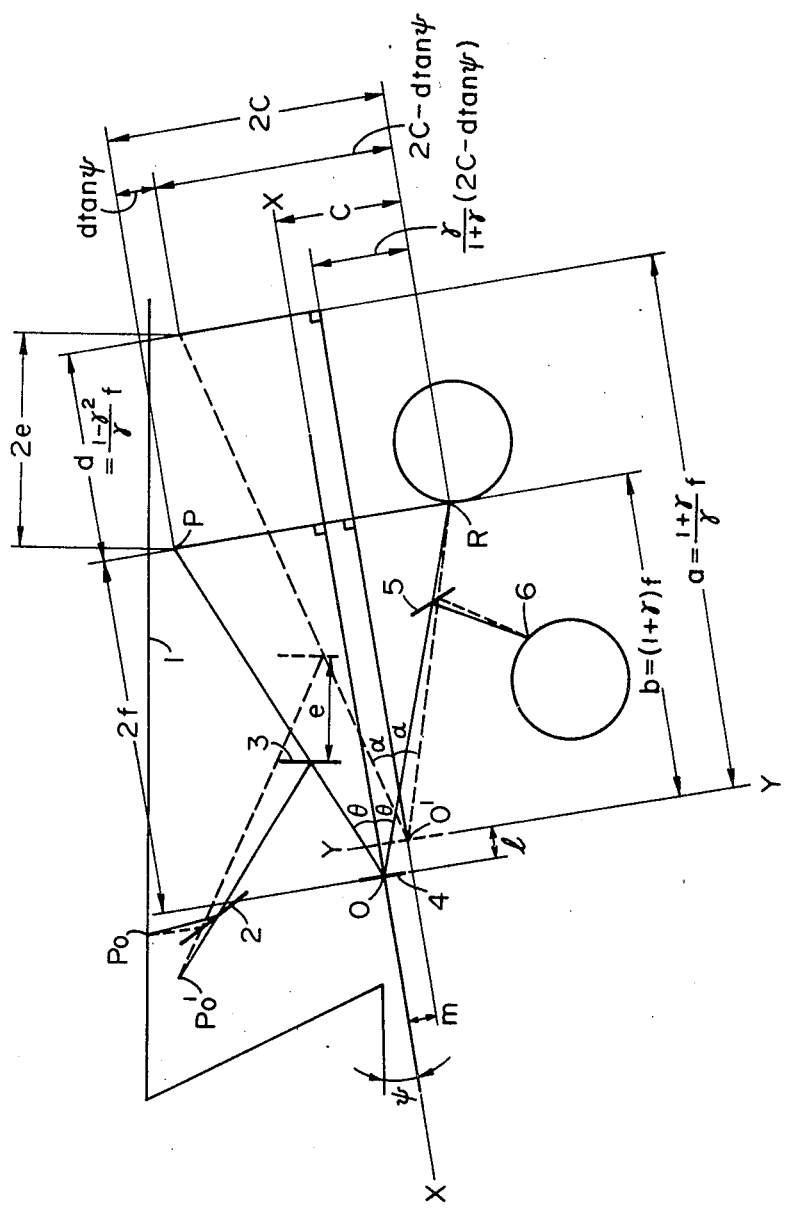
FIG. 3 is an optical illustration.

FIG. 2 illustrates the entire optical system and FIG. 3 is an optical illustration thereof which is exaggerated by lengthening the vertical direction and shortening the horizontal direction to make the angle relations better understood. In the present invention, the optical axis of the in-mirror lens forms an angle of $\psi$ with the original carriage and is made non-parallel to the original carriage, thereby making the vertical dimension of the apparatus smaller.

Here, the various amounts will be defined and described as follows:

$\gamma$: Reduction ratio o: Intersection between the principal plane of the in-mirror lens and the optical axis during one-to-one magnification o': Intersection between the principal plane of the in-mirror lens and the optical axis during reduction ration $\gamma$ $\theta$: Angle formed between the principal ray of the image forming light beam and the optical axis of the lens during one-to-one magnification $\alpha$: Angle formed between the principal ray of the image forming light beam and the optical axis of the lens during reduction $\psi$: Angle formed between the optical axis of the lens and the original carriage glass c: Image height f: Focal length of the lens l: Amount of movement of the lens in the direction of its optical axis when copying magnification is changed from one-to-one magnification to magnification $\gamma(0<\gamma<1)$(amount of movement in x-direction)

m: Amount of movement of the lens in the direction perpendicular to its optical axis (the direction perpendicular to the optical axis in the plane of the drawing sheet and more exactly, the direction perpendicular to the optical axis in a plane containing the optical axis of the lens and the line of direction of movement of the photosensitive member when the optical path has been developed) when copying magnification is changed from one-to-one magnification to magnification $\gamma(0<\gamma<1)$(amount of movement in y-direction)

d: Amount of movement of the position of the virtual image by the first and second mirrors in the direction of the optical axis of the lens when copying magnification is changed from one-to-one magnification to magnification $\gamma$(this direction of movement is parallel to the original carriage glass because the relative relation between the first mirror and the original is not varied by reduction in magnification)

Further, let a be the length of the optical axis on the object side during one-to-one magnification copying, and b be the length of the optical axis on the image side.

Here, $1/a + 1/b = 1/f$ and $$\gamma = b/a$$

From these, $$a = \frac{1+\gamma}{\gamma} f$$

$$b = (1 + \gamma)f$$

$$d = a - b = \frac{1 - \gamma^2}{\gamma} f$$

From this, the amount of movement of the in-mirror lens is x-direction: $l = 2f - b = (1 - \gamma)f$     (1)

y − direction: $m = c - \frac{\gamma}{1 + \gamma}(2c - d\tan\phi)$

By substituting $c = 2f \tan \theta$ and $$d = \frac{1 - \gamma^2}{\gamma} f,$$

$$m = \frac{1-\gamma}{1+\gamma} 2f\tan\theta + (1-\gamma)f\tan\psi \quad (2)$$

Assuming that $l \equiv x$ and $m \equiv y$ and if the relation between x and y, namely, the locus along which the lens is moved is sought after, then from equation (1), $1 - \gamma = \frac{x}{f}$, $1 + \gamma = \frac{2f - x}{f}$ By substituting this for equation (2), $$y = \frac{x}{2f - x} 2f\tan\theta + x\tan\psi \quad (3)$$

If equation (3) is differentiated, $$y = \frac{4f^2}{(2f - x)^2} \tan\theta + \tan\psi \quad (4)$$

From this equation (4), it is seen that the locus of movement of the lens follows a curve starting from the position of one-to-one magnification in the direction of $y = (\tan \theta + \tan \psi)x$ and slightly curved in a mountain shape.

Also, the angle of view α during reduced magnification is given by the following equation:

$$\alpha = \text{Tan}^{-1} \frac{4\tan\theta - \left(\frac{1}{\gamma} - \gamma\right)\tan\psi}{2 + \gamma + \frac{1}{\gamma}}$$

Next, the amount of displacement e of the second movable mirror is obtained $$e = \frac{1 - \gamma^2}{2\gamma\cos\psi} f$$

In the foregoing discription, the method of moving the in-mirror lens 4 in x- and y-direction has been described, but if it is tried to effect copying with the side edge as the standard as disclosed in Japanese Laid-open patent application No. 140319/1977, displacement in z-direction (the direction perpendicular to both the x- and the y-direction) will be necessary and the amount of displacement in such direction is as follows:

$$z = \frac{1 - \gamma}{1 + \gamma} h$$

h: distance in z-direction between the optical axis of the lens and the side edge of the original during one-to-one magnification During magnification change, the second movable mirror 3 is moved parallel to the original carriage 1 to adjust the length of the optical path on the object side and change the initial position of the slit exposure scanning and there after, the ordinary scanning is effected with the second movable mirror moved parallel to the original carriage 1, and a drive guide rail is commonly used for the purposes of changing the initial position and of slit exposure scanning, thus simplifying the mechanism. Further, the apparatus is stable in that the necessity of providing a new drive system is eliminated.

If the optical axis of the in-mirror lens is made parallel to the original carriage, it will prevent the vertical dimension of the apparatus from being smaller and this will now be considered from a condition in which the photosensitive drum 6 has been initially set with respect to the original carriage.

In FIGS. 2 and 3, let Po be the object point of the principal ray, Po' be the mirror image of Po by the first movable mirror 2, P be the mirror image of Po' by the second movable mirror 3, and R be the image point of the principal ray.

In order to make the apparatus compact, it is necessary to make the angle of view small. Now, determine the angle of view θ during one-to-one magnification and consider a system in which the optical axis of the in-mirror lens is parallel to the original carriage. This is a system in which O and P have been rotated together clockwisely about R. The vertical distance between R and P does not substantially vary and it seems that the system in which the optical axis of the in-mirror lens is parallel to the surface of the original is also established as a compact apparatus. Generally, however, the barrel and mounting member of the in-mirror lens 4 have predetermined sizes and therefore, if the angle of view θ is small, the principal ray reflected by the first movable mirror 2 and impinging on the second movable mirror 3 will be kicked by the lens barrel and mounting member. Therefore, if the optical axis of the in-mirror lens is made non-parallel to the surface of the original, the angle of incidence on the second movable mirror 3 of the principal ray reflected by the first movable mirror 2 and impinging on the second movable mirror 3 will be greater and so, the principal ray will not be kicked by the in-mirror lens barrel and mounting member. When the optical axis of the in-mirror lens is thus made non-parallel to the surface of the original, the vertical compactness of the apparatus which could not be achieved by the system in which the optical axis of the in-mirror lens is parallel to the surface of the original can be achieved for the predetermined angle of view $\theta$.

Figure 4:
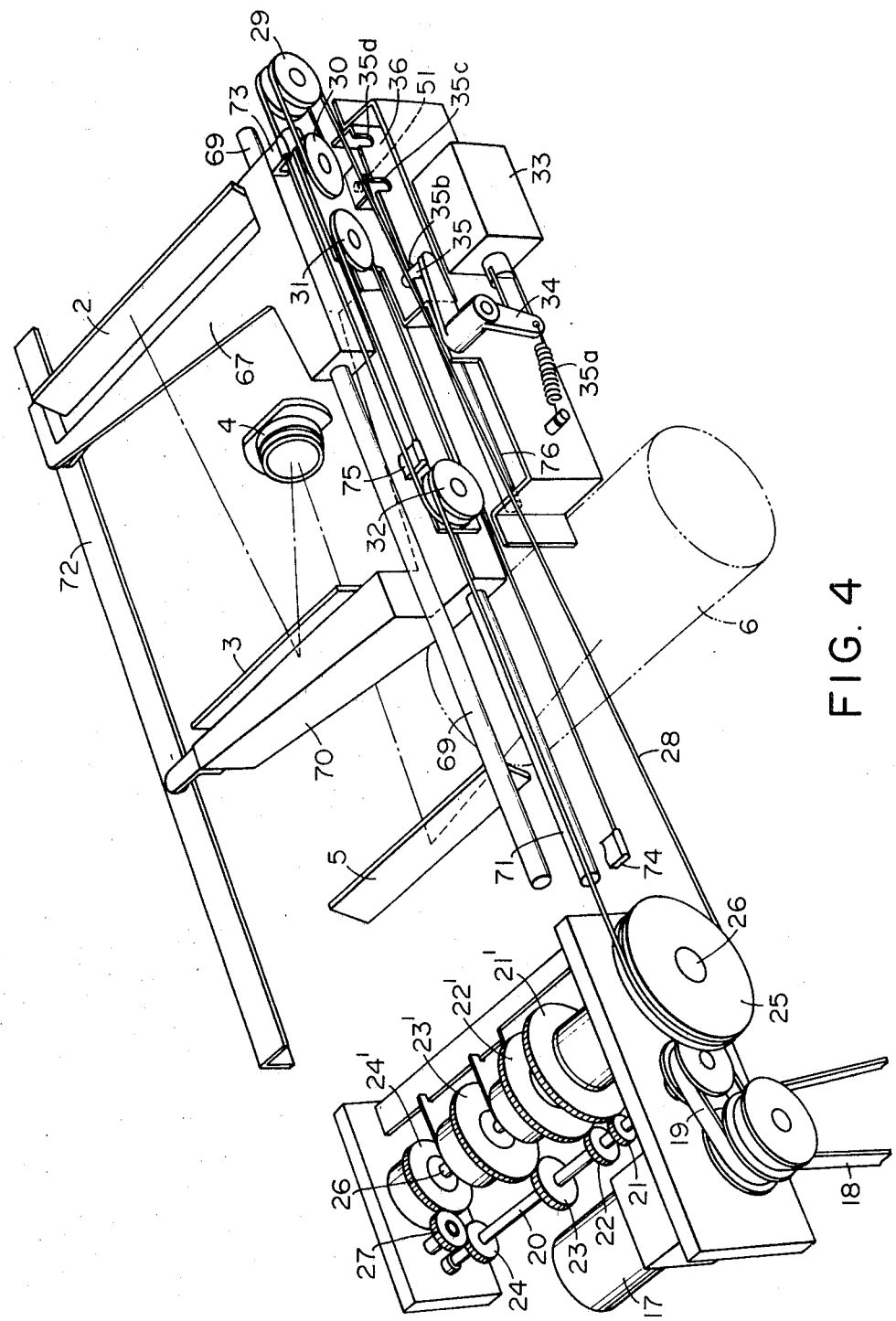
FIG. 4 is a perspective view of the mirror system driving means.

FIG. 4 and so on show a mechanical mechanism concerned in the displacement of the in-mirror lens 4 and the second movable mirror 3 during magnification change. In FIG. 4, the drive of a main motor 17 is transmitted to a drum driving system and other driving system through a belt 18 and also to a mirror driving shaft 20 through a belt 19. Mounted on the shaft 20 are a one-to-one magnification drive transmitting gear 21, a reduction (1) drive transmitting gear 22, a reduction (2) drive transmitting gear 23, and a reversing gear 24. Gears 21', 22', 23' and 24' corresponding to said gears may be coupled to a shaft 26 through clutches to rotate a drive pulley 25, and the respective clutches are operated by instruction signals of one-to-one magnification, reductions (1) and (2) and backward movement. However, in the case of the reversing gear 24, it is necessary to change the direction of rotation thereof and therefore, the gears 24 and 24' are connected through a relay gear 27. The gear ratio is determined so that in the case of one-to-one magnification, the peripheral velocity of the pulley 25 is equal to the peripheral velocity of the photosensitive drum 6, that in the case of reduction, the peripheral velocity of the pulley 25 is at the rate of "peripheral velocity of the photosensitive drum/reduction ratio" and that in the case of reversal, the peripheral velocity of the pulley 25 is higher than that during one-to-one magnification. By this, it is possible to change the scanning speeds during one-to-one magnification and during reductions (1) and (2) and reverse the scanning system.

Figure 5:
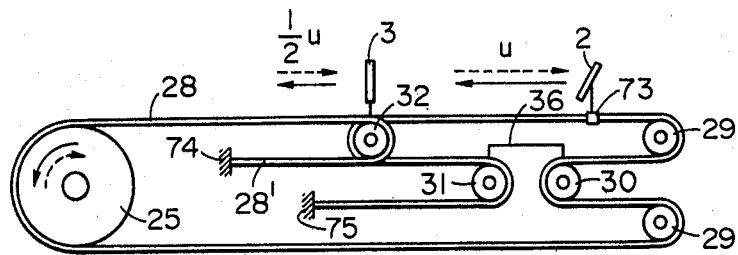
FIG. 5 illustrates the driving wire.

A length of drive wire 28 is passed over the drive pulley 25, as shown in FIG. 4. This is better shown in FIG. 5. In FIG. 5, reference numeral 29 designates pulleys having their shaft positions fixed (in FIG. 5, two such pulleys are shown, but actually they are in the form of a twin pulley as shown in FIG. 4), reference numerals 30 and 31 denote a group of magnification changing pulleys supported on and movable with a magnification changing pulley bed 36, and reference numeral 32 designates a movable pulley movable with the second movable mirror 3. One end of the wire 28 turned back at the pulley 32 and secured to the apparatus body while the other end portion thereof is passed over the pulleys 29, 30, 29, 30 and 31 and similarly secured. When the wire 28 is moved by a distance u, the first movable mirror 2 which is attached to the wire as shown is also moved by a distance u as is the wire 28. The movable pulley 32 is moved by wire 28' having one end secured as shown in FIG. 5 and therefore, the distance of movement thereof is ½u, and the second movable mirror 3 movable with the movable pulley 32 is also moved by a distance of ½u. Accordingly, the first movable mirror 2 and the second movable mirror 3 satisfy the previously described condition that they shall be moved at the velocity ratio of 2:1 in the same direction.

Description will now be made of means for varying the distance between the first and second movable mirrors 2 and 3 in FIG. 4. The magnification changing pulley group 30, 31 is mounted on the magnification changing pulley bed 36 as described above. This magnification changing pulley bed is guided by a rail parallel to the original carriage 1 of the apparatus body so that it is freely movable in a direction parallel to the wire 28 to change the relative position of the first movable mirror 2 and the second movable mirror 3, and is secured by a stop member 35 provided on a lever 34.

During magnification change, the magnification changing pulley bed 36 is moved to change the relative position of the first movable mirror 2 and the second movable mirror 3. When a system is now considered in which the first movable mirror 2 is fixed by a temporary stop, the second movable mirror 3 is displaced by the same amount as the amount of movement of the magnification changing pulley bed 36 and in the same direction. That is, the initial position of the slit exposure scanning during magnification change is set by the movement of the magnification changing pulley bed. The first movable mirror 2 has been described above as being fixed, but detection of the initial position of the slit exposure scanning is usually effected and therefore, when the first movable mirror 2 is not at its original initial position, the first movable mirror 2 and the second movable mirror 3 are returned to their predetermined position at a movement ratio of 2:1 and after the initial position has been detected, the slit exposure scanning is effected. Description will now be made of the mechanisms of various portions during one-to-one magnification copying.

In FIG. 4, when a magnification change instruction is received, a solenoid 33 is first energized to cause the stop member 35 of the lever 34 to be disengaged from any one of the following holes of the magnification changing pulley bed 36, whereby the magnification changing pulley bed 36 becomes free to move in a direction parallel to the wire 28. By a lever 50 (FIG. 7) movable correspondingly to the movement of the in-mirror lens 4, a pin 51 (FIG. 7) on the magnification changing pulley bed 36 is moved to move the magnification changing pulley bed 36 to a predetermined position. Thereafter, the solenoid 33 is deenergized and a stop pin portion 35 is caused by a spring 35a to come into a positioning aperture in the bed 36 which corresponds to the selected magnification, thereby fixing the magnification changing pulley bed 36. In the present embodiment, two types of reduction copying can be selected in addition to one-to-one magnification copying and therefore, three positioning apertures 35b, 35c and 35d (corresponding to one-to-one magnification, and reductions (1) and (2)) are provided in the magnification changing pulley bed 36. The distance of movement may be $$\frac{1-\gamma^2}{2\gamma\cos\psi} f$$

from the position of one-to-one magnification in accordance with the previously described condition.

Figure 6:
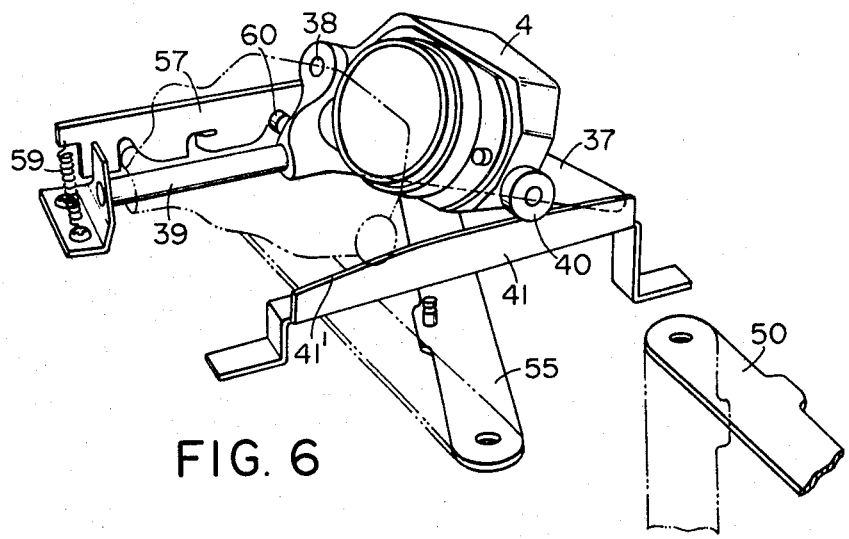
FIG. 6 is a perspective view of the in-mirror lens portion as seen from the rear thereof.
Figure 7:
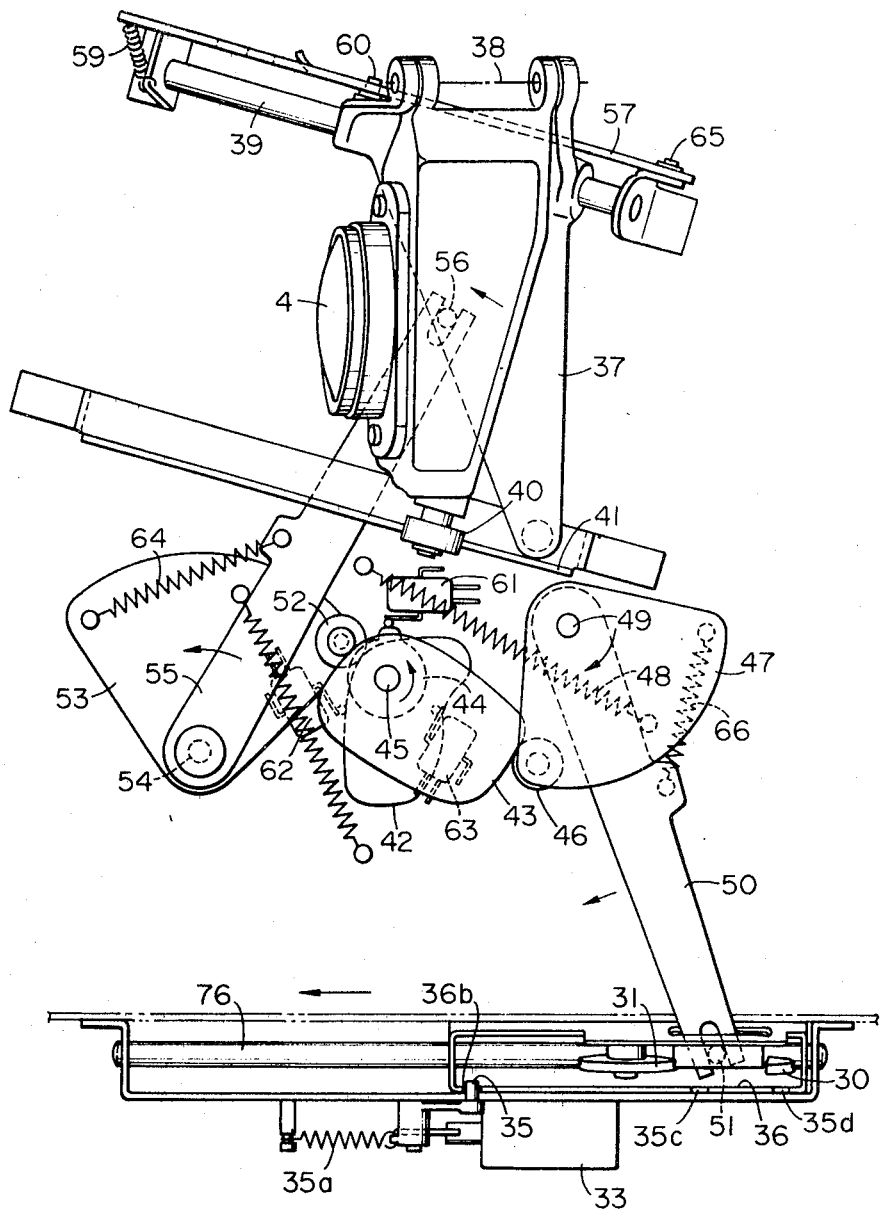
FIG. 7 is a top plan view of the in-mirror lens portion illustrating the connection thereof to the mirror system.

Description will now be made of the movement of the in-mirror lens 4 which is moved during magnification change. To change the in-mirror lens 4 from the one-to-one magnification copying position to the $\gamma$ magnification copying position, it is necessary according to said condition that the in-mirror lens be moved by $(1-\gamma)f$ in the direction of the optical axis of the lens, by $$\frac{1-\gamma}{1+\gamma} 2f\tan\theta + (1-\gamma)f\tan\psi$$

in the Y-direction perpendicular to the optical axis of the lens, and by $$\frac{1-\gamma}{1+\gamma}h$$

in the z-direction which is the optical axis of the lens. Means therefor will be described with reference to FIG. 6 and so on. FIG. 6 is a perspective view of the in-mirror lens portion during one-to-one magnification as seen from the rear thereof, and FIG. 7 is a top plan view of the in-mirror lens portion illustrating the connection thereof to the mirror system.

In FIG. 6, the in-mirror lens 4 is mounted so that the angle formed by the optical axis thereof with the original carriage glass is ψ as shown in said condition, and is rotatable supported with respect to an in-mirror lens support member 37 by a shaft 38 parallel to the optical axis of the in-mirror lens. The in-mirror lens support member 37 is slidably mounted on a slide rail 39 which forms a straight line approximate to the direction of displacement of the lens theoretically obtained on said condition. For example, the rail 39 is parallel to the straight line passing through the lens position during one-to-one magnification copying and the lens position during minimum magnification copying.

In this case, it is a curve that is actually required as the lens orbit, as noted previously, where as an approximately rectilinear movement is only obtained by the aforementioned slide rail 39 alone and therefore, some correction must be made. For this reason, a roller 40 as a cam follower is provided on that end of the in-mirror lens 4 which is opposite to the shaft 38 and this roller 40 is placed on the cam surface 41' of an orbit correcting plate 41 having an orbit correcting curved cam surface 41' on top thereof. Thus, when the support member 37 is slid along the rail 39 by an operation to be described, the roller 40 also rolls on the cam surface 41' at the same time, whereby the lens 4 is vertically moved about the shaft 38 and the lens orbit is corrected to said curve. However, this correction is in the direction perpendicular to the optical axis of the in-mirror lens 4 (Y-direction) and does not cover the correction in the z-direction, because the error in the z-direction is only related to the position of the image on paper and does not adversely affect the image itself.

Of course, the rail 39 supports the member 37 on that side thereof at which the shaft 38 exists and thus, the shaft 38 effects rectilinear movement.

FIG. 7 shows the arrangement of the various portions during one-to-one magnification. When an instruction for the change to reduction copying is received at this point of time, a shaft 45 is driven by a one-way motor, not shown, and cams 42, 43 and 44 integrally mounted on the shaft 45 are rotated counter-clockwisely. A follower 46 contacting the cam 43 and a rockable plate 47 having the follower 46 are clockwisely rotated about a shaft 49 along the profile of the cam 43 by the force of a spring 48 and as a result, a lever 50 mounted on the shaft 49 is moved in the direction of arrow. At this time, the lever 50 causes a pin 51 secured to the magnification changing pulley bed 36 to move the magnification changing pulley bed 36 in the direction of arrow. This movement of the magnification changing pulley bed leads to movement of the mirror system to a predetermined position of the selected reduction (1) or (2).

Likewise, a follower 52 contacting the cam 42 and a rockable plate 53 having the follower 52 are counter-clockwisely rotated about a shaft 54 along the profile of the cam 42 and as a result, a lever 55 mounted on the shaft 54 is moved in the direction of arrow. At this time, the lever 55 moves a pin 56 on the in-mirror lens support member 37 in the direction of arrow to move the member 37 along the rail 39, as a result of which the in-mirror lens portion is moved along said curved path to a predetermined position of the selected reduction (1) or (2). The movements of the mirror system moving cam 43 and the lens portion moving system cam 42 can be controlled by detecting the position of the projected portion of the cam 44 likewise moved together, by means of microswitches 61, 62, 63. That is, the microswitch 61 detects the position during one-to-one magnification, the microswitch 62 detect the position during reduction (1), and the microswitch 63 detecs the position during reduction (2), whereafter the magnification changing motor is stopped from rotating.

The positional accuracy of the mirror system can be obtained by using the positioning apertures 35b, 35c and 35d of the magnification changing pulley bed 36, and the positional accuracy of the lens portion can be obtained by using a positioning plate 57. Levers 55 and 50 movable in response to the cams 42 and 43 are connected to the corresponding cams by springs 64 and 66 to avoid the influence of any dimensional error of the cams, and these levers are designed so as not to move even when the cams are more or less moved.

Figure 8:
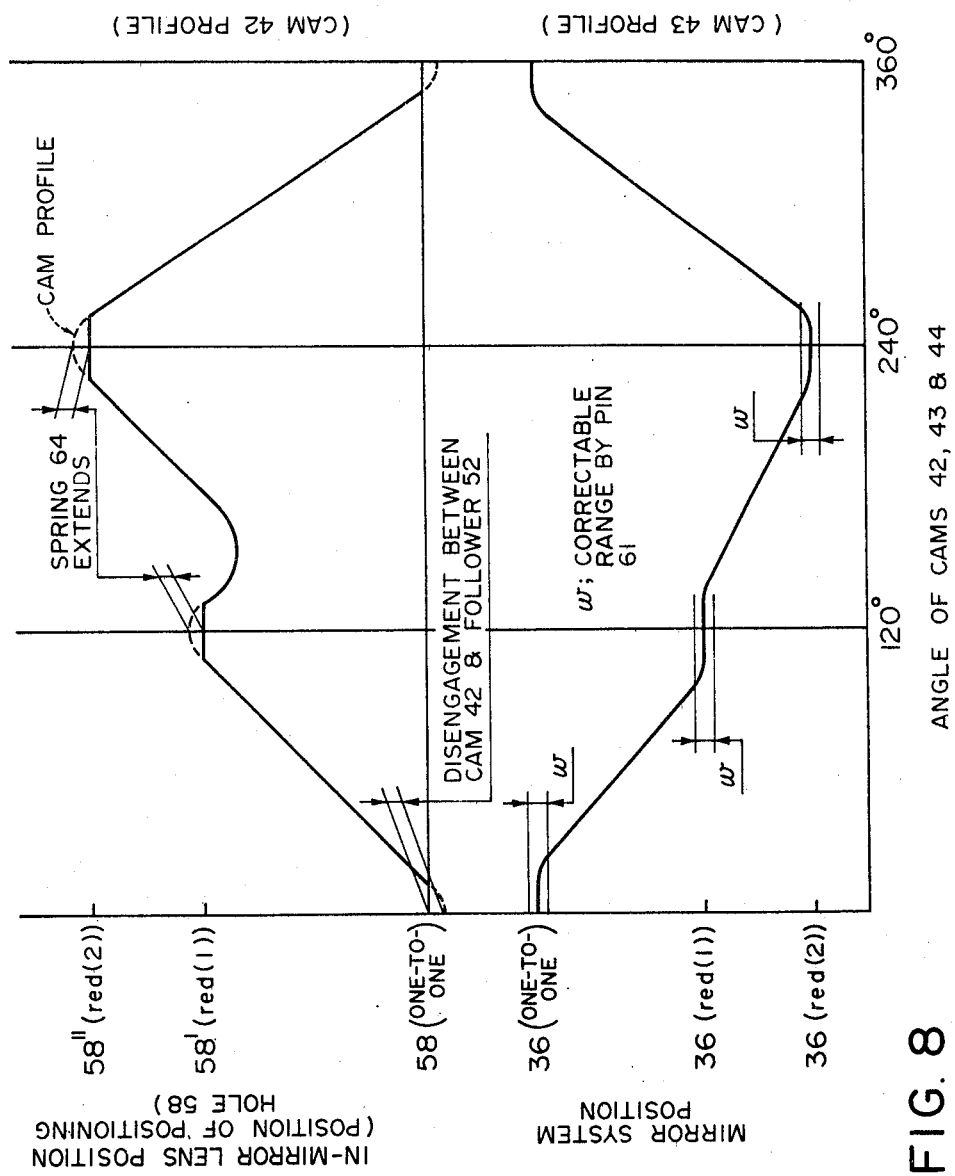
FIG. 8 illustrates the relations of the cam to the in-mirror lens and the mirror system.

FIG. 8 shows the relation between the movement of the mirror system and the movement of the in-mirror lens. As seen in FIG. 8, the mirror system and the lens may assume predetermined positions even if the positions of the cams 42, 43 and 44 are more or less deviated.

Figure 9:
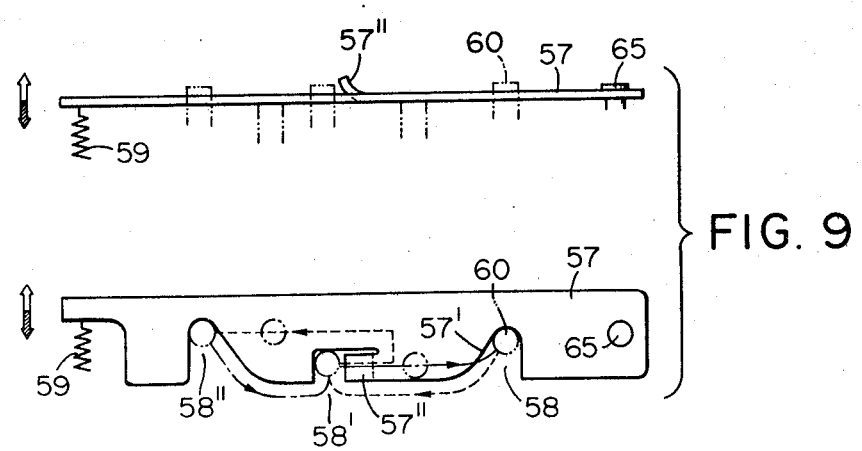
FIG. 9 is an enlarged view of an in-mirror lens positioning plate.

Positioning means for the in-mirror lens will now be described. The positioning plate 57 is of a shape as shown in FIG. 9. In the present embodiment, the positioning plate 57 is provided with three positioning holes 58, 58' and 58" for one-to-one magnification and reductions (1) and (2), respectively, and is mounted at the end of the slide rail 39 support member for vertical and horizontal rocking movement about a shaft 65 in the directions of arrows indicated in FIG. 9. At this time, the positioning plate is pulled by a spring 59 in the direction toward the lens and the downward direction (the directions of the arrows with hatching in FIG. 9).

Now, when the instruction has changed from the one-to-one magnification instruction to the reduction (1) instruction, the in-mirror lens 4 is moved by the lever 55 and the positioning pin 60 secured to the in-mirror lens support member 37 moves from the hole 58 to the hole 58' while contacting the underside of the positioning plate 57 with the peripheral surface of the positioning pin pushing the sloped surface 57' to raise the plate 57 upwardly. When the in-mirror lens further moves to the reduction (2) position, the positioning pin 60 follows the profile of the cam 42 and once returns from the hole 58' toward the hole 58 and at this time, the end portion of the pin 60 pushes the bend 57" to move the positioning plate 57 away from the lens and thereby cause the positioning plate 57 to be downwardly moved by the spring 59 and the pin 60 moves to a position in which it does not enter the hole 58', whereafter the pin 60 moves toward the hole 58" with the end thereof contacting the positioning plate 57. At the hole 58", the positioning plate 57 is brought into proximity to the lens by the spring 59 and the pin 60 fits into the hole 58". This movement is indicated by the broken line in FIG. 9.

When the in-mirror lens returns from the reduction (2) position, the positioning pin 60 moves from the hole 58" to the hole 58' while contacting the underside of the positioning plate 57 with the peripheral surface of the pin 60 pushing the sloped surface to raise the positioning plate 57 upwardly. When the in-mirror lens is further moved to the one-to-one magnification position, the end portion of the positioning pin 60 pushes the bend 57" to move the positioning plate 57 away from the lens and the pin 60 returns and fits into the holf 58 while contacting the positioning plate 57. The movement shown in FIG. 9 is relative and actually, the positioning plate 57 moves vertically and horizontally.

Thus, where there are three selectible magnifications, the in-mirror lens positions corresponding to these magnifications lie not an a straight line but on a curve, but the straight line guide means is used also as the cam curve guide means, whereby the in-mirror lens can be easily displaced to an exact postion.

Accordingly, there is obtained an in-mirror reduction optical system which can be adopted for a desk-top type compact copying machine.

In FIG. 4, reference numeral 67 designates a holding bed for the first movable mirror 2 and the original illuminating light source 68 (FIG. 1). The holding bed 67 is connected to wire 28 by a connector 73. Designated by 69 is a movement guide rail for the holding bed 67, and denoted by 70 is a second movable mirror holding bed on which is supported the movable pulley 32. Reference numeral 71 designates a guide rail for the holding bed 70, reference numeral 72 denotes a guide rail common to the two holding beds, reference numerals 74 and 75 denote means for fixing the ends of the wire 28 to the machine frame, and reference numeral 76 designates a guide rail for the magnification changing pulley bed 36 on which are mounted the pulleys 30 and 31.

The embodiment of the present invention has the following features:

(1) For the movement l of the in-mirror lens in the direction of its optical axis and the movement m of the in-mirror lens in the direction perpendicular to the optical axis, provision in made of the approximately rectilinear guide rail 39 and the orbit cam 41 for correcting any error in the m direction;

(2) The positioning plate 57 is used to position the lens.

(3) The relative position of the mirror is determined by engagement between the depressions 35b–35d provided in the magnification changing pulley bed 36 and the pin 35.

(4) The integral cams 42, 43 and the levers 55, 50 operatively associated with the cams are used to move the lens and mirror.

(5) Springs 66, 48, 62 and 64 are provided between the cams 42, 43 and the levers 50, 55 and the positioning of the lens and mirror by the depressions in the cam plates 57, 36 and the pins 60, 35 has preference to the positioning thereof by the surfaces of the cams 42, 43.

According to the present invention, as has been described above, the in-mirror lens having its optical axis non-parallel to the surface of the original and the second scanning mirror lying at the object side are switchably displaced in a predetermined direction during magnification change, whereby there can be provided a variable magnification copying apparatus which is compact and simplified in mechanism and which has an excellent optical performance.

What we claim is:

1. A variable magnification copying apparatus comprising an original carriage, a first movable mirror movable parallel to said original carriage at a velocity V and located at the object side and in the vicinity of said original carriage in the optical path, a second movable mirror movable at a velocity $(\frac{1}{2})$V in the same direction as said first movable mirror and remote from said original carriage in the optical path, an in-mirror lens having its optical axis non-parallel to said original carriage, and a second movable mirror holding member and an in-mirror lens holding member supporting thereon said second movable mirror and said in-mirror lens, respectively, and displaceable by predetermined amounts in predetermined directions during a magnification change such that the object point position of a principal light ray on said original carriage is maintained fixed and a constant angle is maintained between said original carriage and the optical axis of said in-mirror lens irrespective of the magnification change while the principal light ray at the object side is inclined with the change in magnification.

2. A variable magnification copying apparatus according to claim 1, wherein during a magnification change, said in-mirror lens is displaced by l in the direction of its optical axis and by m in the direction perpendicular to the surface of said original carriage and at right angles to said optical axis and wherein $$l = (1 - \gamma)f$$

$$m = \frac{1 - \gamma}{1 + \gamma} 2f\tan\theta + (1 - \gamma)f\tan\psi$$

where f is the focal length, $\psi$ is the angle formed by the optical axis of said in-mirror lens with the surface of said original carriage, $\theta$ is the angle of incidence of the image forming principal light ray, and $\gamma$ is the copying magnification.

3. A variable magnification copying apparatus according to claim 2, wherein during a magnification change, said in-mirror lens is displaced by Z in the lengthwise direction of a slit and wherein $$Z = \frac{1 - \gamma}{1 + \gamma} h$$

where h is the distance in the lengthwise direction of the slit between the optical axis of the lens and the side edge of an original during one-to-one magnification, and $\gamma$ is the copying magnification.

4. A variable magnification copying apparatus comprising an original carriage, a first movable mirror movable parallel to said original carriage at a velocity V and located at the object side and in the vicinity of said original carriage in the optical path, a second movable mirror movable at a velocity $(\frac{1}{2})$V in the same direction as said first movable mirror and remote from said original carriage in the optical path, an in-mirror lens having its optical axis non-parallel to said original carriage, an in-mirror lens holding member holding said in-mirror lens, a rectilinear slide rail for rectilinearly moving a predetermined end of said in-mirror lens holding member, a position adjusting cam plate for correcting the optical position of said in-mirror lens by sliding movement of the predetermined other end of said in-mirror lens holding member, and a second movable mirror holding member and an in-mirror lens holding member for displacing said second movable mirror and said in-mirror lens by predetermined amounts in predetermined directions during magnification change such that the object point position of a principal light ray on said original carriage is maintained fixed and a constant angle is maintained between said original carriage and the optical axis of said in-mirror lens irrespective of the magnification change while the principal light ray at the object side is inclined with the change in magnification.

5. A variable magnification copying apparatus comprising an original carriage, a first movable mirror movable parallel to said original carriage at a velocity V and located at the object side and in the vicinity of said original carriage in the optical path, a second movable mirror movable at a velocity (½)V in the same direction as said first movable mirror and remote from said original carriage in the optical path, an in-mirror lens having its optical axis non-parallel to said original carriage, an in-mirror lens holding member holding said in-mirror lens, a positioning pin fixed to said in-mirror lens holding member, and a positioning plate for causing said positioning pin to fit in a predetermined position corresponding to each magnification to maintain the object point position of a principal light ray on said original carriage fixed during magnification, said positioning plate partly having a bent portion and a cam profile, wherein irrespective of a change in magnifixation a constant angle is maintained between said original carriage and the optical axis of said in-mirror lens while the principal light ray at the object side is inclined with the change in magnification.

6. A variable magnification copying apparatus according to claim 5, wherein during a first magnification change, said positioning pin is spaced apart from said positioning plate by said bent portion of said positioning plate and slides on the side surface of said positioning plate and is controlled to a predetermined position and during a second magnification change, said positioning pin slides along the cam profile of said positioning plate and is controlled to a predetermined position.

7. A variable magnification copying apparatus according to claim 6, wherein one end of said positioning plate is fixed and the other end thereof is fluctuant by an expansible member.

8. A variable magnification copying apparatus comprising an original carriage, a first movable mirror movable parallel to said original carriage at a velocity V and located at the object side and in the vicinity of said original carriage in the optical path, a second movable mirror movable at a velocity (½)V in the same direction as said first movable mirror and remote from said original carriage in the optical path, an in-mirror lens having its optical axis non-parallel to said original carriage, a one-way rotation common drive source used for the displacement of said second movable mirror and said in-mirror lens, a driving cam, a rocking plate and a driving lever for imparting a drive force to said second movable mirror, a driving cam, a rocking plate and a driving lever for imparting a drive force to said in-mirror lens, a positioning plate for controlling the positions of said second movable mirror and said in-mirror lens to maintain the object point position of a principal light ray on said original carriage fixed during magnification, and a microswitch provided at a position corresponding to the rotation of said driving cam and adapted to cut off the drive force after the position control by said positioning plate, wherein irrespective of a change in magnification a constant angle is maintained between said original carriage and the optical axis of said in-mirror lens while the principal light ray at the object side is inclined with the change in magnification.

9. A variable magnification copying apparatus according to claim 8, wherein said rocking plates and said driving levers are coupled together by an expansible member.

* * * * *

UNITED STATES PATENT AND TRADEMARK OFFICE
CERTIFICATE OF CORRECTION

PATENT NO. : 4,453,824

DATED : June 12, 1984

INVENTOR(S) : HIROYUKI MIYAKE, ET AL.

It is certified that error appears in the above-identified patent and that said Letters Patent is hereby corrected as shown below:

On the Title Page, under [75] Inventors:
"HIROYUKI MIYAKE, Inagi," should read
--HIROYUKI MIYAKE, Tokyo--.

Column 5, line 21, "dtan$\phi$" should read --dtan$\psi$--;
line 68, after "obtained" insert as a new line
--from d = 2e cos$\psi$,--.

Column 10, line 13, "detect" should read --detects--;
line 14, "detecs" should read --detects--.

Column 11, line 10, "holf" should read --hole--.

Signed and Sealed this

Twelfth Day of March 1985

[SEAL]

Attest:

DONALD J. QUIGG

Attesting Officer     Acting Commissioner of Patents and Trademarks